US012300906B2

(12) United States Patent
Semilovsky

(10) Patent No.: US 12,300,906 B2
(45) Date of Patent: May 13, 2025

(54) HIGH TRANSPARENCY ANTENNA STRUCTURE

(71) Applicant: Huawei Technologies Co., Ltd., Guangdong (CN)

(72) Inventor: Dmitrij Semilovsky, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 218 days.

(21) Appl. No.: 18/157,669

(22) Filed: Jan. 20, 2023

(65) Prior Publication Data

US 2023/0163468 A1 May 25, 2023

Related U.S. Application Data

(63) Continuation of application No. PCT/EP2020/071188, filed on Jul. 28, 2020.

(51) Int. Cl.
*H01Q 5/378* (2015.01)
*H01Q 3/26* (2006.01)
*H01Q 5/48* (2015.01)

(52) U.S. Cl.
CPC ........... *H01Q 5/378* (2015.01); *H01Q 3/2611* (2013.01); *H01Q 5/48* (2015.01)

(58) Field of Classification Search
CPC ......... H01Q 5/378; H01Q 3/2611; H01Q 5/48
See application file for complete search history.

(56) References Cited

U.S. PATENT DOCUMENTS 3,858,220 A 12/1974 Arnow
7,283,101 B2 10/2007 Bisiules et al.
10,020,582 B2 7/2018 Tsubaki et al.
2003/0030994 A1 2/2003 Takaya et al.
2013/0187743 A1 7/2013 Chang et al.
2015/0357702 A1* 12/2015 Tani .................... G01B 7/003 343/904
2016/0365645 A1 12/2016 Bisiules
2017/0373385 A1 12/2017 Alu et al.
2018/0323513 A1 11/2018 Varnoosfaderani et al.
2020/0127389 A1 4/2020 Li et al.

FOREIGN PATENT DOCUMENTS

CN 104868229 A 8/2015
WO 2017084979 A1 5/2017
WO 2019072391 A1 4/2019

OTHER PUBLICATIONS

Ying Liu et al., A Novel Miniaturized Broadband Dual-Polarized Dipole Antenna for Base Station. IEEE Antennas and Wireless Propagation Letters, vol. 12, 2013, 4 pages.

* cited by examiner

*Primary Examiner* — Dieu Hien T Duong

(74) *Attorney, Agent, or Firm* — WOMBLE BOND DICKINSON (US) LLP

(57) ABSTRACT

Described is an antenna structure including a first antenna configured to emit electromagnetic radiation having a first operational frequency band; a second antenna configured to emit electromagnetic radiation having a second operational frequency band; and wherein the second antenna comprises an inductive element configured to inhibit interference of the second antenna with the electromagnetic radiation emitted from the first antenna.

20 Claims, 7 Drawing Sheets

HIGH TRANSPARENCY ANTENNA STRUCTURE

CROSS-REFERENCE TO RELATED APPLICATIONS

This application is a continuation of International Application No. PCT/EP2020/071188, filed on Jul. 28, 2020, the disclosure of which is hereby incorporated by reference in its entirety.

TECHNICAL FIELD

Embodiments of the present disclosure relate to antennas, in particular to antenna structures that are transparent to a broad range of frequencies.

BACKGROUND

An antenna is a transducer that converts radio frequency electric current to electromagnetic waves that are then radiated into space.

Portable handheld units, such as mobile phones, are often required to receive different signals within different frequency bands. With the deployment of 5G, in order to support the new bands of 700 MHz and 3.5 GHz, there is a growing demand in the market to develop antennas with an increased number of bands. For example, it is desirable for an antenna array to radiate at frequency bands of, for example, 700 MHz, 800 MHz, 900 MHz, 1.8 GHz, 2.1 GHz, 2.6 GHz and 3.5 GHz together. In addition, in order to fully exploit the capabilities of the New Radio (NR) standard, the number of transceivers and therefore arrays (columns) dedicated to each band also increase.

Despite the increased number of bands and ports per band, the limitation of one antenna per sector (or a maximum of two in exceptional cases) is still a strict requirement and will likely not change over time. In addition, to facilitate the site acquisition and/or to be able to reuse current mechanical support structures in the sites, the form factor and therefore the wind-load of the new antennas should be comparable to legacy products.

In general, networks cannot be densified to add new sites, new antennas cannot be added in the site, and the dimensions of the antennas cannot be significantly increased. This scenario leads to an increased complexity in which any technology or new antenna concept that enables the integration of several bands together in a neat and efficient way is highly desirable.

SUMMARY

According to some embodiments, there is provided an antenna structure comprising: a first antenna configured to emit electromagnetic radiation having a first operational frequency band; a second antenna configured to emit electromagnetic radiation having a second operational frequency band; wherein the second antenna includes an inductive element configured to inhibit interference of the second antenna with the electromagnetic radiation emitted from the first antenna.

An antenna structure incorporating such an inductive element may have ultra broadband RF transparency, which allows for placement of other radiating elements for higher frequency bands directly underneath the antenna, therefore increasing the density of integration of base station antennas.

The inductive element may be configured to inhibit interference of the second antenna for frequency bands which are above the second operational frequency band. This may allow the second antenna to be transparent to higher band radiating elements without degrading the performance of any of the bands.

The inductive element may be configured to inhibit electromagnetic radiation emitted by the first antenna from resonating with the second antenna. Due to the increased inductance, an incident electromagnetic wave from higher frequency bands may then excite only weak currents along the axis of the coil like structure. The radiation emitted by the first antenna may therefore excite only weak currents in the inductive structure. Since only very weak currents are excited, the incident wave may pass through with very low distortion.

The second antenna may be defined by a conductive structure and the inductive element may be electromagnetically coupled to the conductive structure. The inductive element may be galvanically coupled to the conductive structure. The inductive element may be integral with the conductive structure of the second antenna.

The inductive element may include a conductor having an at least partially coiled or helical structure. This may be a convenient embodiment in order to realize the inductive element.

The inductive element may include at least one winding. This may allow a relatively high magnetic flux and inductance to be achieved.

At least one of the first antenna and the second antenna may be a dipole antenna. The antenna(s) may be a dual polarized dipole antenna. Dipole antennas are commonly used in telecommunications equipment, such as base stations. The second antenna may include two dipoles. The polarization of electromagnetic radiation emitted by the two dipoles may be +/−45 degrees. This may be a convenient embodiment for telecommunications applications.

At least part of the first operational frequency band may be higher than the second operational frequency band. This may allow the second antenna to be transparent to higher band radiating elements.

The first antenna may be smaller in size than the second antenna. The first antenna may be located within the periphery, or the area of the footprint, of the second antenna. The first antenna may be fully or partially located within the periphery of the second antenna. This may allow for placement of other radiating elements for higher frequency bands directly underneath the second antenna and therefore may increase the density of integration of base station antennas.

The inductive element may be formed on a substrate. The substrate may be made from an electrically insulating plastic material. The inductive element may be formed on a printed circuit board (PCB). The inductive element may include a conductor extending between first and second layers of a PCB. The feeding for an antenna using the described approach does not require any special solution and can be made out of PCB structures or any other conventional, low cost material.

The first operational frequency band may include frequencies in the band between 1.4-2.7 GHz. The second antenna may therefore be transparent to electromagnetic radiation having frequencies in at least part (or parts) of the band between 1.4-2.7 GHz. This may allow the antenna structure to be implemented in telecommunications networks.

According to a second aspect there is provided an antenna array including at least two antennas having the antenna structure described above. The solution may therefore be implemented in applications requiring the emission of different signals within different frequency bands by multiple antennas. With the deployment of 5G, in order to support the new bands 70 MHz and 3.5 GHz, there is a growing demand in the market to develop antennas with an increased number of bands. Such a structure may be conveniently configured to radiate at frequency bands of 700 MHz, 800 MHz, 900 MHz, 1.8 GHz, 2.1 GHz, 2.6 GHz and 3.5 GHz all together in a structure such as a base band station antenna.

BRIEF DESCRIPTION OF THE FIGURES

The present disclosure will now be described by way of example with reference to the accompanying drawings. In the drawings:

FIG. 1(*b*) shows an example of a traditional antenna configuration where the radiation emitted by the first antenna is distorted and reflected by the second antenna.

FIG. 2(*b*) schematically illustrates an example of an inductive element according to some embodiments of the present disclosure.

FIG. 4(*b*) shows a top-side view of an example of possible arrangement in a base band station antenna according to some embodiments of the present disclosure.

FIG. 6(*b*) shows an example of the bottom view of the approach realized on a double layer PCB according to some embodiments of the present disclosure.

DETAILED DESCRIPTION

Conventional antenna systems are generally focused on a few approaches to enhance capabilities, such as a reduction in size of the antenna, thus decreasing mutual coupling between adjacent antennas, and embedding higher band radiators inside lower band radiators. However, when conventional systems reduce the size of the antenna, a physical limit is reached to which the antennas can be miniaturized without compromising the key performance indicators (KPIs). Due to the lack of radio frequency (RF) transparency, the footprint of the antenna creates shadowing with no usable space underneath for placing other radiative elements. Radiative elements in the area of the footprint suffer degeneration of their radiation pattern. When conventional systems embed an additional radiating element for higher frequency bands in an antenna for lower frequency bands, disadvantages arise when embedding higher band radiators inside lower band radiators. Since one lower band element accommodates one higher band element, the effective of space for the higher band element is the same as the space usage for the lower band element. The distance between the higher band elements is dictated by the distance between the lower band elements. This limits the freedom of placement and makes an optimal distance between higher band elements very difficult. Such design increases the mechanical complexity and may lead to higher production costs. Prior art solutions may also require additional parts, such as metal sheet feeding lines, plastic supports and other non-trivial components. As such, it is desirable to develop an antenna structure with improved transparency.

Described herein is an antenna arrangement including a radiating element that may be transparent to higher band radiating elements without degrading the performance of any of the bands.

Figure 1:
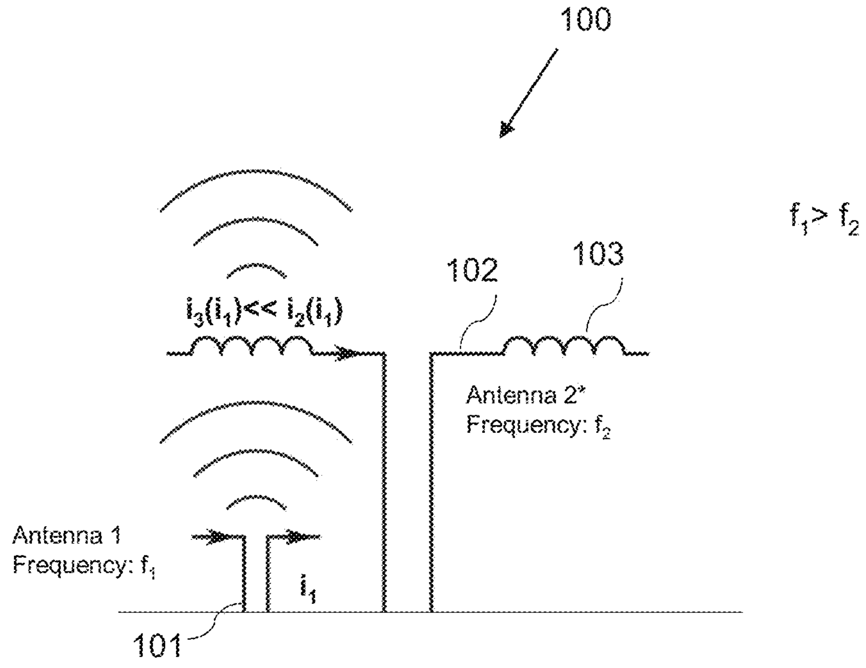
FIG. 1(*a*) shows a configuration where the radiation emitted by a first antenna passes undistorted through a second antenna which includes the transparency structure according to some embodiments of the present disclosure.
Figure 1:
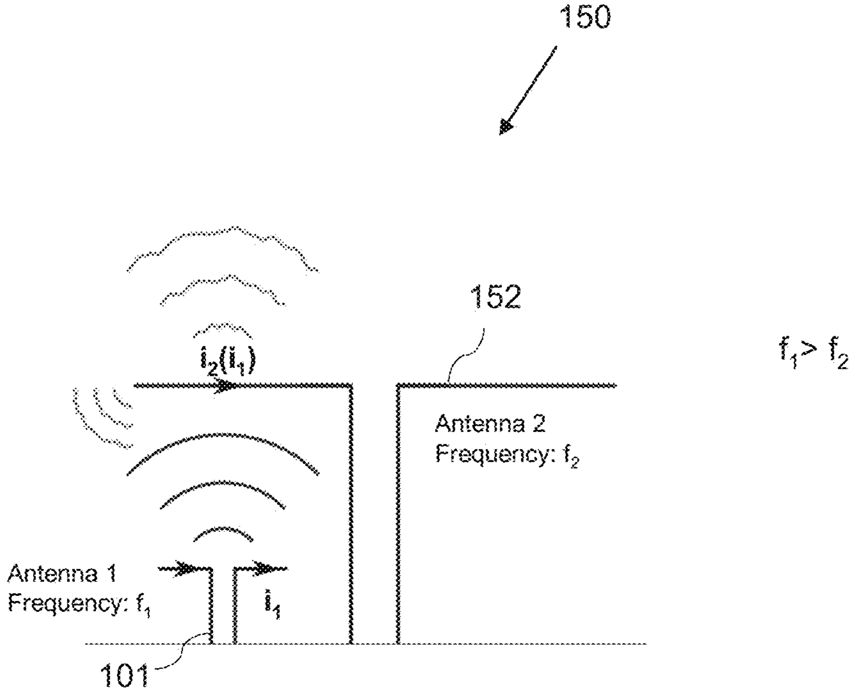

FIG. 1(*a*) schematically illustrates an example of an antenna configuration according to some embodiments of the present disclosure. The antenna 100 includes a first antenna or radiating element 101 and a second antenna or radiating element 102. In this example, the first antenna 101 is smaller in size than the second antenna 102 and is located within the periphery of the second antenna. The first antenna is electrically conductive and carries a current i1. The first antenna 101 is configured to emit electromagnetic radiation having a first operational frequency band, illustrated as f1. The second antenna 102 configured to emit electromagnetic radiation having a second operational frequency band, illustrated as f2. In this example, frequencies within the band f1 are greater than within f2. The second antenna 102 includes an inductive element 103 configured to inhibit interference of the second antenna with the electromagnetic radiation emitted from the first antenna.

The second antenna 102 is electrically conductive and carries a current i3. The second antenna has an inductive structure. The inductive element is electromagnetically coupled to the antenna. The inductive element is preferably electrically coupled to the antenna. The inductive element is preferably integral with the second antenna. In some examples, as will be described in more detail below, the second antenna may include more than one inductive element. Therefore, the second antenna may as a whole have an inductive structure. The first and/or second antennas preferably have a resonant structure.

When a current flows through the second antenna, the inductive element has a relatively high magnetic flux relative to the first antenna. Preferably, the high magnetic flux is only in the frequency range where the antenna should be effectively transparent to electromagnetic radiation emitted by the first antenna. In this example, this is to radiation having frequencies in the band f1. The second antenna may have a relatively high impedance compared to the first antenna. Preferably, the high impedance is only in the frequency range where the antenna should be effectively transparent to electromagnetic radiation emitted by the first antenna. The high magnetic flux may result in the high impedance in the second antenna. The inductive element may have a relatively low loss.

The inductive structure of the antenna enables transparency of the second antenna to the radiation emitted by the first antenna. The second antenna is therefore preferably effectively transparent for frequency bands which are allocated above the operating frequency band of the second antenna.

As shown in FIG. 1(*a*), the inductive element may have a coil like structure which is winded to increase the magnetic flux and as a result increase the stored magnetic energy, yielding in an increase in inductance.

Due to the increased inductance, an incident electromagnetic wave from higher frequency bands may then excite only weak currents along the axis of the coil like structure. Since only very weak currents are excited, the incident wave from the first antenna may pass through the second antenna with very low distortion.

Compared to the conventional antenna arrangement 150 shown in FIG. 1(*b*), where electromagnetic radiation having an operational frequency band f1 emitted by antenna 101 is distorted and reflected by antenna 152, which carries a current i2, the second antenna in the arrangement of FIG. 1(*a*) inhibits interference of the second antenna with the electromagnetic radiation emitted from the first antenna.

From the perspective of the incident wave coming from elements radiating higher frequency bands, the inductive structure can act like a passband, allowing higher frequencies to pass through with minimal reflection. This approach can be used on antennas or other elements that need to be made transparent for electromagnetic waves.

Figure 2:
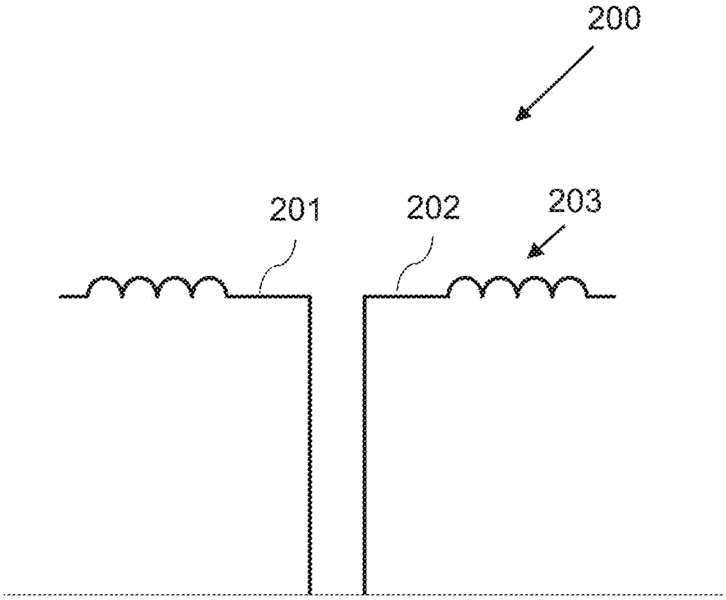
FIG. 2(*a*) schematically illustrates an example of an antenna having an inductive structure according to some embodiments of the present disclosure.
Figure 2:
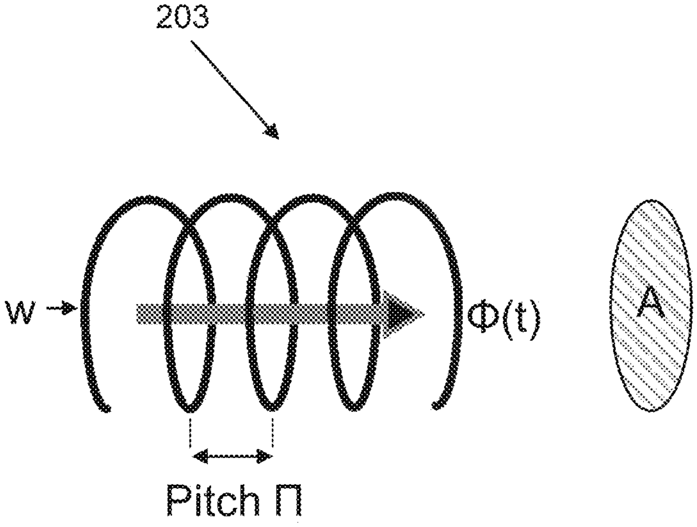
Figure 3:
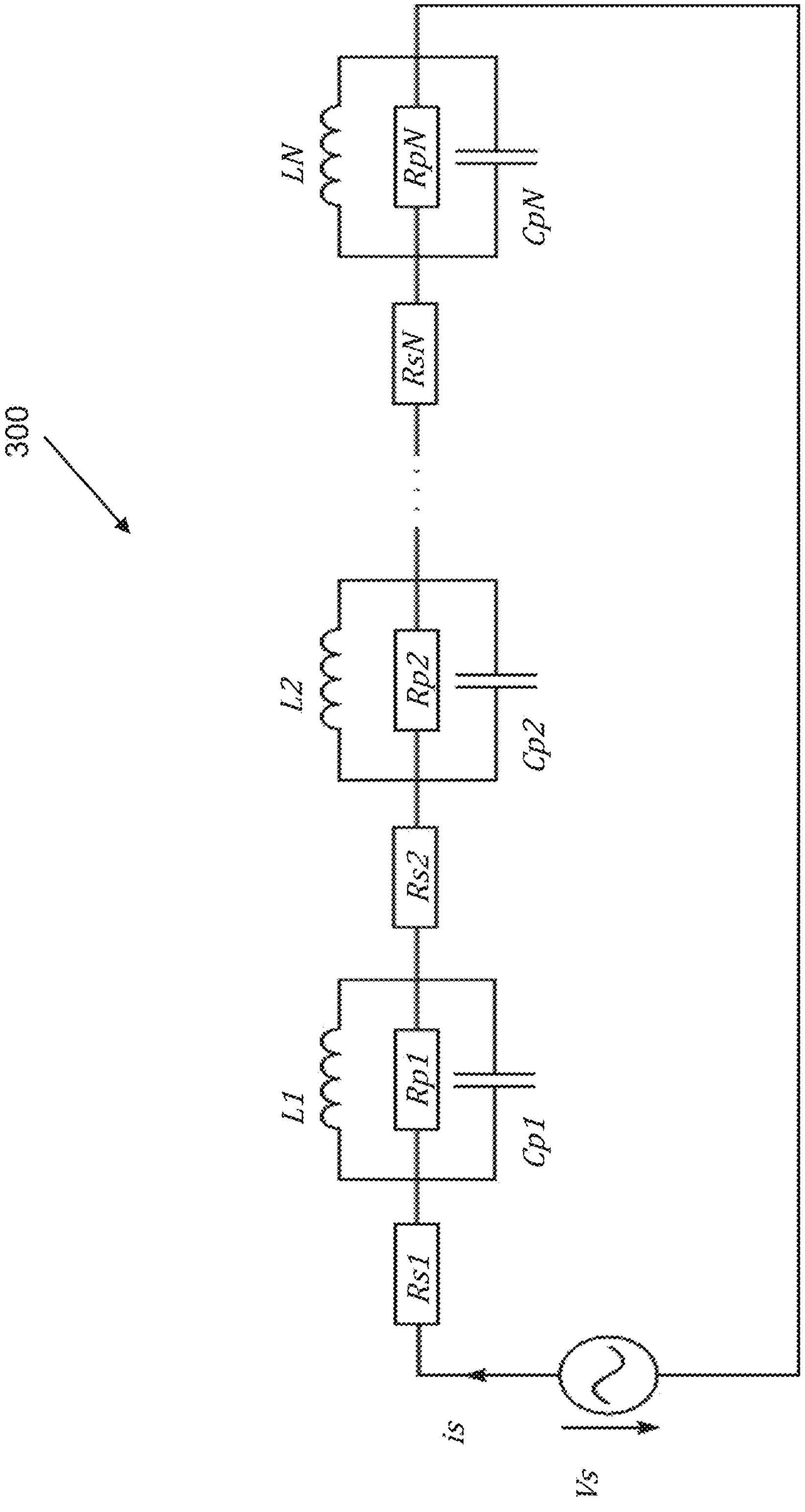
FIG. 3 schematically illustrates a simplified equivalent circuit of the coil like structure depicted in FIGS. 2(*a*) and 2(*b*) according to some embodiments of the present disclosure.

An embodiment of an antenna including an inductive structure can be seen in FIGS. 2(*a*) and 2(*b*) with the corresponding simplified equivalent circuit in FIG. 3.

FIG. 2(*a*) schematically illustrates an example of an application of the described approach for transparency according to some embodiments of the present disclosure. As shown in more detail in this Figure, the antenna 200 having the inductive structure is a dipole antenna.

In this example, the antenna arrangement 200 has an inductive element 203 incorporated into each arm 201 and 202 of the dipole. Therefore, each arm 201 and 202 of the dipole has an inductive structure. Each arm 201 and 202 of the dipole is defined by a conductive structure and the inductive element 203 is electromagnetically coupled to, and integral with, the conductive structure.

As shown in more detail in FIG. 2(*b*), the inductive element 203 includes a conductor having an at least partially coiled or helical structure with at least one winding according to some embodiments of the present disclosure. The inductive element 203 may include a conductor with multiple windings. $\pi$ is the pitch of the coil, w is coil width, A is the area enclosed by one coil loop and Φ is magnetic flux, which is a function of time.

As shown in the schematic equivalent circuit 300 of FIG. 3, the inductive behaviour of the antenna may be simplified in a model according to some embodiments of the present disclosure. The antenna may be modelled as a number N of components having the following properties: a resistance $Rs_n$ (a series resistance), an inductance $L_n$, a capacitance $Cp_n$ and a resistance $Rp_n$ (a parallel resistance).

All lumped elements in the equivalent circuit of FIG. 3 are frequency and geometry dependent, as illustrated in Table 1 below, where f is the frequency of the electromagnetic radiation.

TABLE 1

| |
|---|
| $Rs_n = Rs_n(\pi, w, A, f)$ |
| $L_n = L_n(\pi, w, A, f)$ |
| $Rp_n = Rp_n(\pi, w, A, f)$ |
| $Cp_n = Cp_n(\pi, w, A, f)$ |

This model demonstrates that by controlling the properties of such a coil, the inductance can be controlled such that, for a certain range of frequencies, the antenna is transparent.

The frequency dependent impedance of an ideal coil is given by jωL, where j is the imaginary unit: $j^2=-1$, ω is the angular frequency ω=2πf and L is the inductance. The frequency dependent impedance of an ideal capacitor C is given by $$\frac{1}{j\omega C}.$$

Using this model, the transparency effect may persist when the inductance is dominating the circuit characteristic. Therefore $$|j\omega L_n| \ll \left|\frac{1}{j\omega C_n}\right| \text{ or } \omega \ll \frac{1}{\sqrt{L_n C_n}}, |j\omega L_n| \ll \left|\frac{1}{j\omega C_n}\right|$$

can be interpreted as follows: if the impedance of the inductor is considerably smaller than that of the capacitor, the structure is mainly inductive.

In another embodiment, transparency may also be achieved if the frequency is below the resonance of the inductive structure.

Figure 4:
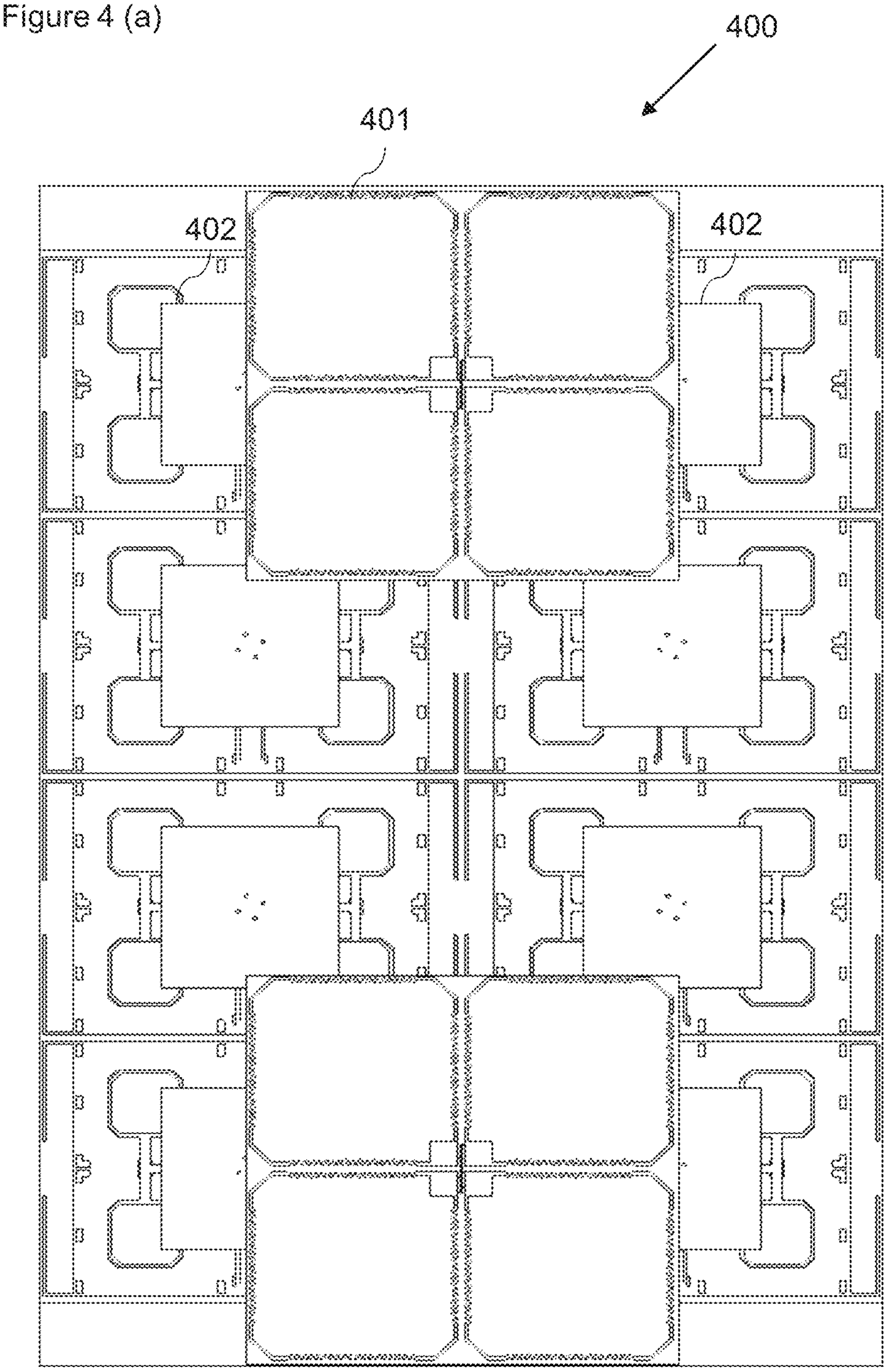
FIG. 4(*a*) shows a top view of an example of possible arrangement in a base band station antenna according to some embodiments of the present disclosure.
Figure 4:
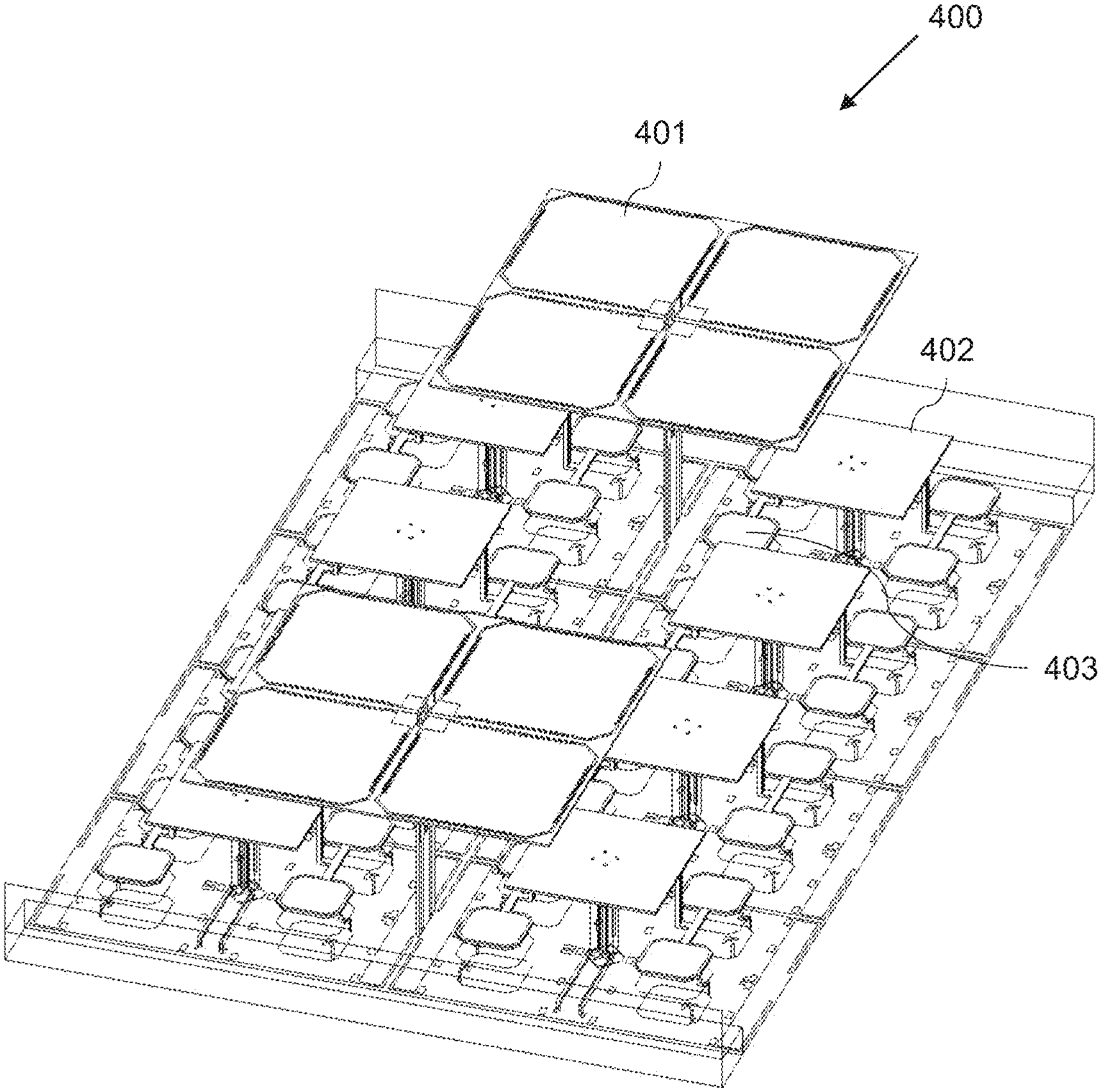

In some embodiments, the antenna structure in a base band station antenna 400 is shown in FIGS. 4(*a*) and 4(*b*). FIG. 4(*a*) shows a top view of an example of the possible arrangement and FIG. 4(*b*) shows a top-side view according to some embodiments of the present disclosure.

Underneath the dipole 401, which is a low band (LB) antenna (approximately 690-960 MHz), are two high band (HB) (approximately 1.7 GHz-2.7 GHz) antennas 402 and four CB (approximately 3.3 GHz-4.2 GHz) antennas 403. The C-band (CB) 403 is fully shadowed by the LB 401 (e.g., is located fully within the periphery of the LB) while the HB 402 is half shadowed (partially located within the periphery of the LB). Despite the CB and HB being directly under the LB, their radiation pattern and antenna efficiency may be substantially unaffected by the presence of the LB. Smaller antennas may therefore be located in the area of the footprint of a larger antenna without degeneration of their radiation pattern.

The antenna structure may therefore include one or more additional antennas in addition to the first and second antennas (for example antennas 101 and 102 respectively) described above. For example, the antenna structure may include a third antenna. The additional antenna(s) may be fully or partially located within the periphery of the first antenna and/or the second antenna. The additional antenna (s) may optionally be a dipole antenna. The additional antenna(s) may preferably be configured to emit electromagnetic radiation having different operational frequency bands to the first and second antennas. The frequencies within the additional band(s) may be greater than those frequencies within at least the second band.

The first antenna and/or the additional antenna(s) may have any of the features of the second antenna described above, such as an inductive element.

The antenna structure described herein can further be implemented as an antenna array including at least two antennas having the antenna structure described above, which further facilitates it usage in applications such as 5G base stations requiring the emission of different signals within different frequency bands by multiple antennas.

The frequency of the electromagnetic radiation emitted by the antennas may be in the range 690 MHz to 4 GHz. For example, the two antennas in the structure or the multiple antennas in the array may be configured to emit electromagnetic radiation having operational frequency bands that individually encompass at least frequencies of 700 MHz, 800 MHz, 900 MHz, 1.8 GHz, 2.1 GHz, 2.6 GHz and 3.5 GHz. For example, the antennas in a multiple antenna array may be LB, MB, HB and/or C-band antennas having frequency bands of approximately 690-960 MHz, 1.5-2.2 GHz, 2.3-2.7 GHZ and 3.3-5 GHz respectively.

Figure 5:
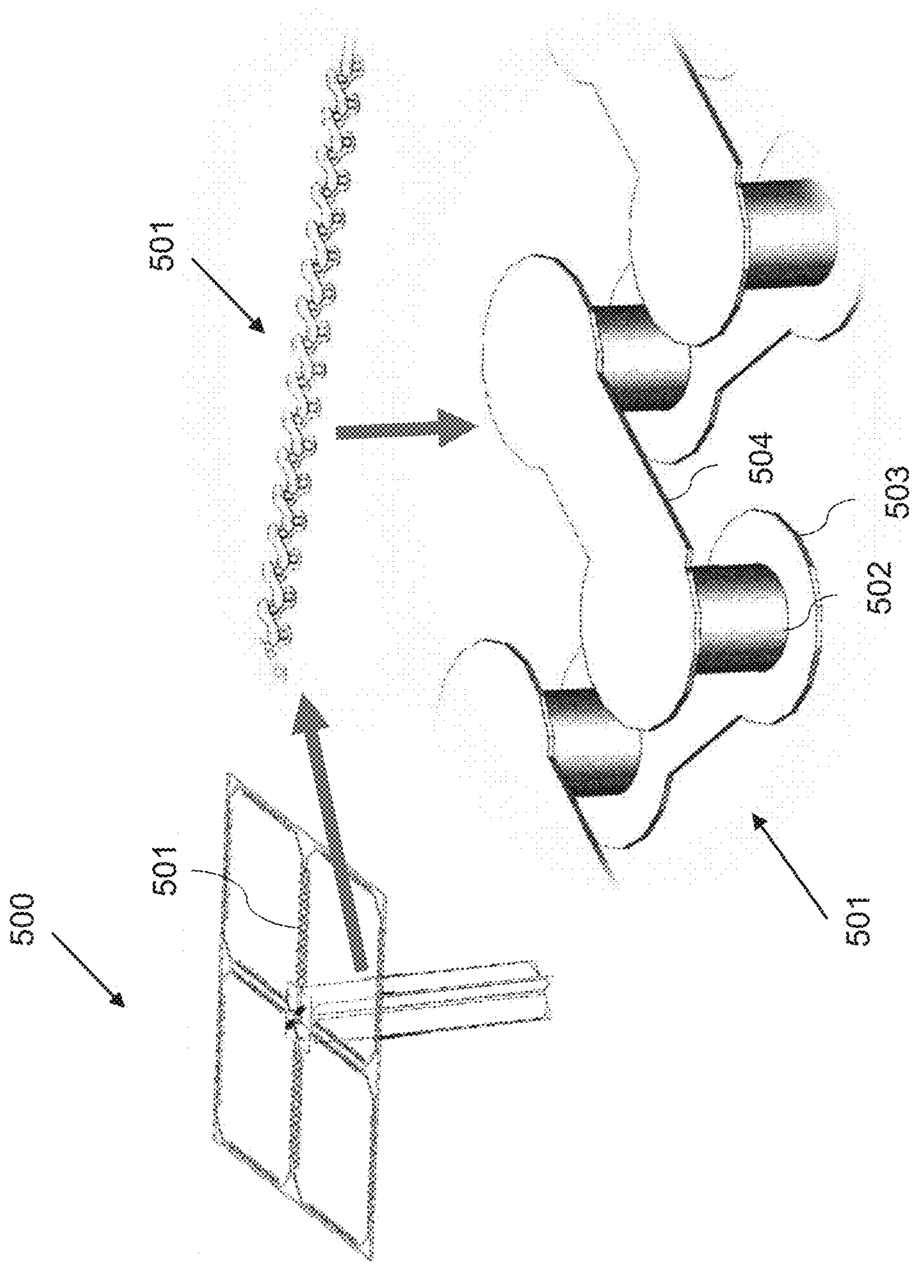
FIG. 5 shows an example of a dual polarized dipole antenna realized on a double layer PCB according to some embodiments of the present disclosure.
Figure 6:
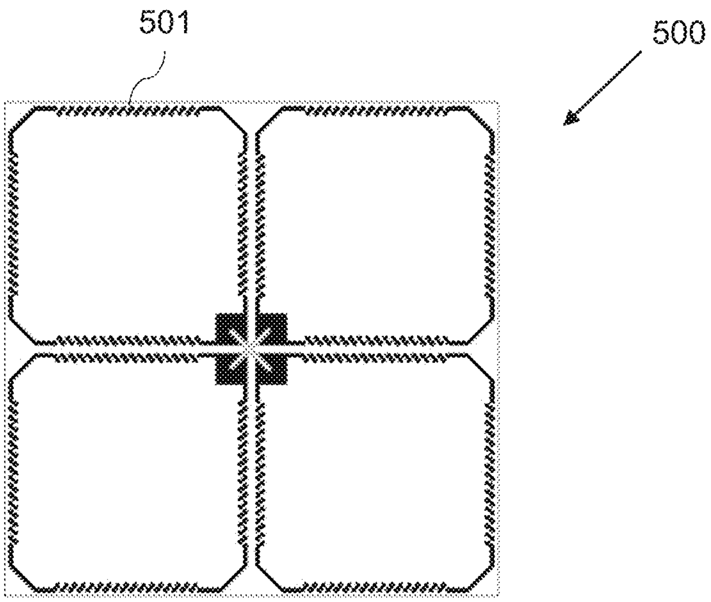
FIG. 6(*a*) shows an example of the top view of the approach realized on a double layer PCB according to some embodiments of the present disclosure.
Figure 6:
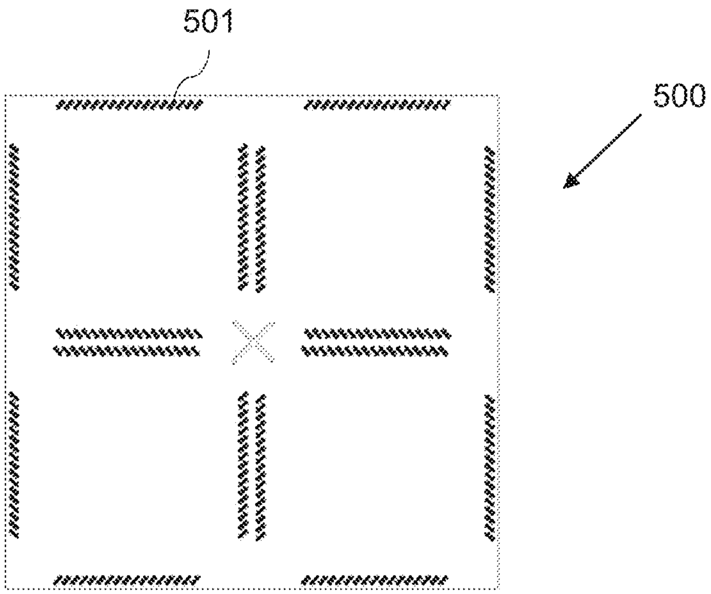

FIGS. 5, 6(*a*) and 6(*b*) show embodiments of the approach in a dual polarized dipole antenna realized on a double layer PCB.

As shown in the example of antenna 500 in FIG. 5 according to some embodiments of the present disclosure, the inductive element 501 may include a plurality of conductors, such as the conductive element shown at 502, extending between conductive tracks, such as 503 and 504, on first and second layers of a PCB. The conductor 502 is galvanically connected to conductive tracks on the first and second layers of the PCB. The two layers of the PCB are spaced apart vertically (for example, in a direction parallel to the longitudinal axis of conductor 502). The conducting tracks formed on the top and bottom layers of the double layer PCB can be seen in the top and bottom views of FIGS. 6(*a*) and 6(*b*) respectively. The first and second layers of the PCB may extend parallel to one another. The conductor 502 extends between the two layers of the PCB in a direction approximately perpendicular to the planar extent of each of the PCB layers. In this example, the conductor 502 is a via. The via is conveniently shaped as a cylinder, but may have a different shape. The conducting tracks on the first and second layers of the PCB are connected by the conductor 502 so as to form a conducting path.

The two layers of a PCB may therefore be interconnected in a such way that conductive tracks on each of the PCB layers and a plurality of conductive elements extending between the tracks form a spherical, helical or similar inductive structure that may act as a transparent structure to radiation emitted by another antenna, as described above. In other words, the inductive element of the antenna may include conductive tracks formed on each layer of a double layer PCB that are electromagnetically or galvanically coupled or connected via conducting elements extending in a direction approximately perpendicular to the planar extent of the PCB.

FIG. 6(*a*) shows an example of the top view of the antenna 500 realized on a double layer PCB according to some embodiments of the present disclosure. FIG. 6(*b*) shows an example of the bottom view of the approach realized on a double layer PCB according to some embodiments of the present disclosure. The inductive element 501 is formed on a substrate, which in this case is made from an electrically insulating plastic material.

The approach can therefore be easily implemented on a dual layer PCB with vias or on a 3D printed plastic substrate.

The approach described herein allows for the realization of an antenna or separate structures of an antenna that are transparent for frequency bands which are allocated above the operating frequency band of the transparent structure.

In an arrangement where a smaller antenna is located within the periphery of a larger antenna, the inductive structure of the antenna can prevent the electromagnetic wave emitted by the smaller antenna from resonating with the larger antenna and/or avoid interaction between the antennas.

This allows the transparent, ultrabroadband radiating element to function in very close proximity to higher band radiating elements, without degrading each other's performance. This opens new possibilities for base band antenna architecture which allows significant increase in integration density.

The examples described herein use a coiled or helical structure as the inductive element. However, other ways of providing an inductive structure may also be utilized.

The approach described herein has several advantages. The antenna structure has ultra-broadband RF transparency, which allows for placement of other radiating elements for higher frequency bands directly underneath the antenna and therefore increasing the density of integration of base station antennas. When the structure is made transparent by using the described approach, it largely maintains the same or very similar behaviour at the operating frequency bands, while not reflecting energy at higher frequency bands. In addition, due to the low complexity, the structure can be easily implemented on a double sided PCB or on a metallized, 3D printed plastic. The feeding for an antenna using the described approach does not require any modified solution and can be made out of PCB structures or any other conventional, low cost material.

The described approach may therefore overcome some of the problems of prior approaches and may help to reduce the complexity of the antennas and fulfil the requirements of the next generation of base station antennas.

The antenna configuration described herein can be used in a range of devices, such as mobile phones, base stations, radars, or antennas mounted on airplanes.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present disclosure may consist of any such individual feature or combination of features. In view of the foregoing description, it will be evident to a person skilled in the art that various modifications may be made within the scope of the present disclosure.

The invention claimed is:

1. An antenna structure comprising:

a first antenna configured to emit electromagnetic radiation having a first operational frequency band;

a second antenna configured to emit electromagnetic radiation having a second operational frequency band; and wherein the second antenna comprises an inductive element configured to inhibit interference of the second antenna with the electromagnetic radiation emitted from the first antenna, the inductive element comprises a conductor extending between first and second layers of a printed circuit board (PCB) of the antenna structure and forming a conducting path, and the first layer of the PCB and the second layer of the PCB extend parallel to one another.

2. The antenna structure as claimed in claim 1, wherein the inductive element is configured to inhibit the interference of the second antenna for frequency bands which are above the second operational frequency band.

3. The antenna structure as claimed in claim 1, wherein the inductive element is configured to inhibit the electromagnetic radiation emitted by the first antenna from resonating with the second antenna.

4. The antenna structure as claimed in claim 1, wherein the second antenna is defined by a conductive structure and the inductive element is electromagnetically or galvanically coupled to the conductive structure.

5. The antenna structure as claimed in claim 1, wherein the inductive element comprises a conductor having an at least a partially coiled or helical structure.

6. The antenna structure as claimed in claim 1, wherein the inductive element comprises at least one winding.

7. The antenna structure as claimed in claim 1, wherein at least one of the first antenna and the second antenna is a dipole antenna.

8. The antenna structure as claimed in claim 1, wherein the second antenna comprises two dipoles and wherein a polarization of the electromagnetic radiation emitted by the two dipoles is +/−45 degrees.

9. The antenna structure as claimed in claim 1, wherein at least part of the first operational frequency band is higher than the second operational frequency band.

10. The antenna structure as claimed in claim 1, wherein the first antenna is smaller in size than the second antenna.

11. The antenna structure as claimed in claim 10, wherein the first antenna is located within a periphery of the second antenna.

12. The antenna structure as claimed in claim 1, wherein the inductive element is formed on a substrate of the antenna structure.

13. The antenna structure as claimed in claim 12, wherein the substrate is made from an electrically insulating plastic material.

14. The antenna structure as claimed in claim 1, wherein the conductor is a via.

15. The antenna structure as claimed in claim 1, wherein the first operational frequency band comprises frequencies in a frequency band between 1.4-2.7 GHZ.

16. An antenna array comprising at least two antennas having an antenna structure, wherein the antenna structure comprises:

a first antenna configured to emit electromagnetic radiation having a first operational frequency band;

a second antenna configured to emit electromagnetic radiation having a second operational frequency band; and wherein the second antenna comprises an inductive element configured to inhibit interference of the second antenna with the electromagnetic radiation emitted from the first antenna, the inductive element comprises a conductor extending between first and second layers of a printed circuit board (PCB) of the antenna structure and forming a conducting path, and the first layer of the PCB and the second layer of the PCB extend parallel to one another.

17. The antenna array according to claim 16, wherein the inductive element is configured to inhibit the interference of the second antenna for frequency bands which are above the second operational frequency band.

18. The antenna array according to claim 16, wherein the inductive element is configured to inhibit the electromagnetic radiation emitted by the first antenna from resonating with the second antenna.

19. A base station comprising an antenna array, wherein the antenna array comprises at least two antennas having an antenna structure, wherein the antenna structure comprises:

a first antenna configured to emit electromagnetic radiation having a first operational frequency band;

a second antenna configured to emit electromagnetic radiation having a second operational frequency band; and wherein the second antenna comprises an inductive element configured to inhibit interference of the second antenna with the electromagnetic radiation emitted from the first antenna, the inductive element comprises a conductor extending between first and second layers of a printed circuit board (PCB) of the antenna structure and forming a conducting path, and the first layer of the PCB and the second layer of the PCB extend parallel to one another.

20. The base station according to claim 19, wherein the inductive element is configured to inhibit the interference of the second antenna for frequency bands which are above the second operational frequency band.

* * * * *